Nov. 24, 1964   P. R. GEORGE   3,158,136
MILKING MACHINE TEAT CUP
Filed May 1, 1963   2 Sheets-Sheet 1

INVENTOR
PAUL ROBERT GEORGE
BY Herbert A. Winturn
ATTORNEY

Nov. 24, 1964    P. R. GEORGE    3,158,136
MILKING MACHINE TEAT CUP

Filed May 1, 1963    2 Sheets-Sheet 2

INVENTOR
PAUL ROBERT GEORGE
BY Herbert Q. Winters
ATTORNEY

3,158,136
MILKING MACHINE TEAT CUP
Paul R. George, Cambridge City, Ind., assignor to
Golay & Co., Inc., Cambridge City, Ind.
Filed May 1, 1963, Ser. No. 277,363
6 Claims. (Cl. 119—14.52)

This invention relates to that part of a cow milking machine which is termed the teat cup. The teat cup normally and in modern practice consists of two parts, namely a substantially rigid shell and an internal flexible, elastic inflation. The wall of the shell is generally externally cylindrical throughout its length having a full diameter inlet opening which receives a collar of the inflation to retain the inflation centrally within the shell and to limit the passage of the inflation longitudinally through the shell. Heretofore the shell has also been of a constant diameter internally. A tubular end of the inflation passes through the outlet end of the shell in an air sealing manner and extends from the shell a sufficient distance to interconnect with a claw or a milk pail. The inflation customarily employed varies in diameter from a large diameter at the collar end to a slightly smaller diameter at the end to which the discharge tube is connected. The discharge tube and the body of the inflation are integrally formed. The discharge tube is normally more resistant to bending and collapse than is the main body of the inflation within the shell.

A primary object of the invention is to provide a shell which will receive the more or less standard inflation as generally described above with a minimum air space between the shell and the inflation so that less air volume is required to be handled by the vacuum pump normally employed in the milking operation with a consequent permissible reduction in size of the pump and in power input required by the pump.

A further important object of the invention is to provide in conjunction with an inflation having the uniform thickness of wall, both smooth inside and outside throughout its length to its tube end in the absence of having to have any special corrugations or creases in the wall of the inflation.

Still further, by use of the present invention herein described, the wall of the inflation may be very flexible and elastic to have what may be termed a "soft" action.

Before describing the invention in detail, it is desirable that the actual milking operation be understood when a teat cup carrying the inflation is used in conjunction with a milking machine. This milking operation will be described following the description of the several views in the drawing, in which FIG. 1 is a view in side elevation of a teat cup to which is applied an inflation;

Figures 1, 4:
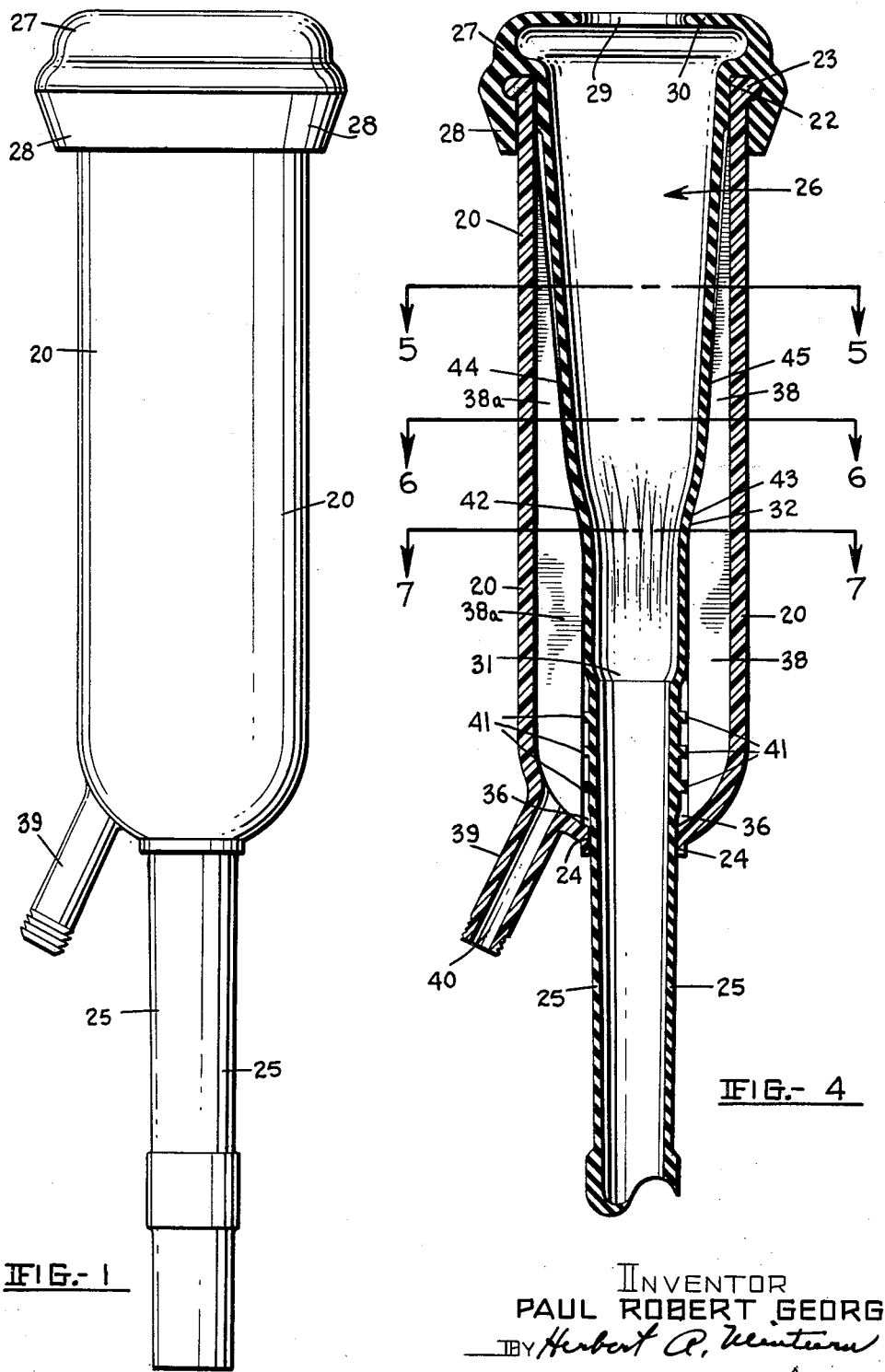
FIG. 4 is a view in longitudinal central section on the line 4—4 in FIG. 2.
Figure 2:
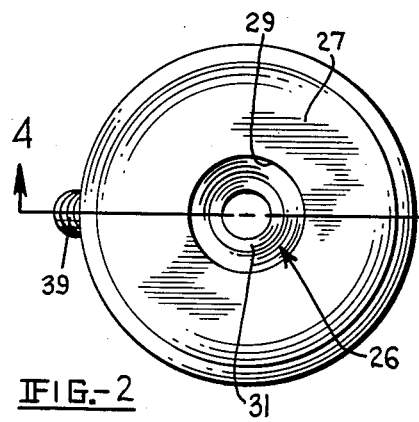
FIG. 2 is a view in top or inlet end of the teat cup assembly.
Figure 3:
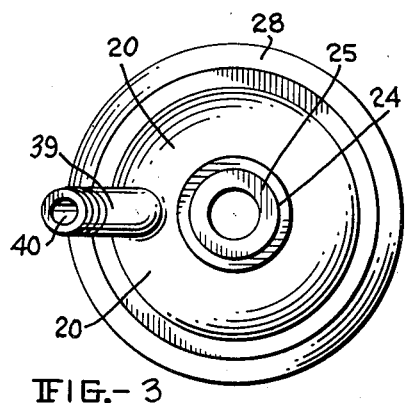
FIG. 3 is a view in lower or discharge end of the assembly.

In the machine milking of a cow, the usual inflation 10 is inserted within the shell 11 to extend axially therethrough from the end 12 to have a tube 13 leading through the end 14 of the shell. It is by means of this tube 13 that the interior of the inflation 10 is partially evacuated. There is a nipple 15 opening into the interior of the shell 11, and by means of a pulsator (not shown) well known to those versed in the art, the interior of the shell 11 is intermittently evacuated and atmospheric air is admitted under normal atmospheric pressure.

The inflation 10 is entered over the cow's teat 16. The tube 13 is interconnected with a vacuum line wherein the degree of vacuum is constantly maintained. In one particular milking system, a ten inch (mercury column) vacuum is maintained. By means of this vacuum, milk is induced to flow into the inflation from the cow's teat 16 and out through the tube 13. This tube carrying vacuum cannot be applied to the cow's teat constantly without damage to the cow's teat or udder or a reduction in the supply of milk. This vacuum is applied for sixty percent of the time milking cycle for which the pulsator is designed and set in one form. During this sixty percent of the time cycle, the space between the inflation inside of the shell 11 is also partially evacuated, but at a slightly higher vacuum than is within the tube 13 and inside of the inflation 10. This prevents the inflation from collapsing below the lower end of the cow's teat 16. Then for the forty percent period of the milking cycle, the pulsator will cut off the vacuum flow and permit introduction of atmospheric air through the nipple 15 while the vacuum in the tube 13 in the lower end of the inflation 10 remains at its constant value. Incidentally, the vacuum applied between the outside of the inflation and the inside of the shell is approximately one inch higher than that within the inflation.

Figures 8, 9:
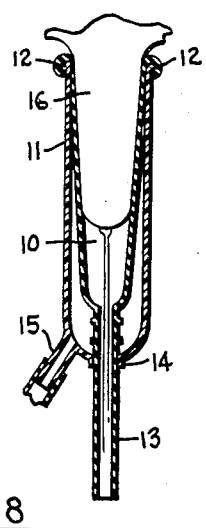
FIG. 8 is a view diagrammatically shown in central vertical section through a teat cup with a cow's teat received within the inflation.
FIG. 9 is a semidiagrammatic sectional view with atmospheric pressure applied within the shell.

When the air at atmospheric pressure is admitted to the inside of the shell 11 around the lower end of the inflation 10, the inflation promptly collapses to effectively close the lower end of the inflation between the cow's teat and the tube 13 so that application of vacuum from the tube 13 is greatly reduced. Then continued action of the pulsator cuts off the inlet of air and applies a vacuum to the inside of the shell 11 thereby, with the cooperation of the vacuum in the tube 13 causing the elastic inflation 10 to expand rapidly to its normal position as shown in FIG. 8, FIG. 9 showing the position or condition of the inflation when air pressure is applied to the outside of the inflation within the shell 11. Thus through the intermittent action as just set out, all occasioned by the pulsator, milk is induced to flow from the cow's teat 16.

The inflation is sufficiently thin walled and soft and elastic to permit the closure thereof at the zone indicated by the numeral 17, FIG. 9, without applying any material external pressure to the cow's teat confined within the upper portion of the inflation. It is to be noted that at no time does the differential in pressure between the outside and the inside of the inflation during the milking operation exceed four to five inches. This introduction of atmospheric pressure likewise causes no particular change in the pressure on the cow's teat.

Now with that operation in mind, the present invention is described.

The shell generally designated by the numeral 20 is herein indicated as being made out of a suitable rigid plastic such as by a molding process. Due to the internal shaping of the shell, it is much easier to mold the form desired out of plastic than it is to form it out of metal. Metal of course may be used, although it is believed it would be more expensive to do so than to employ the plastic.

The shell 20 is generally cylindrical externally, but its interior does not follow the contour of the exterior surface of the shell. The end 22 of the shell 20 has a full circular opening and is preferably provided with an annular rib 23 therearound. The lower end of the shell 20 has an opening 24 centrally therethrough to receive the tube 25 of the inflation 26. The upper end of the inflation carries a head 27 which has an outer and downturned flange 28 elastically stretching over the rib 23 and extending down a short distance along the outer surface of the shell 20. There is an opening 29 through the head 27, this opening being through a rather thin section 30 extending laterally around the opening 29 and across the teat receiving end of the inflation 26. The inflation 26 extends from the head 27 in a normally circular tubular manner, the internal diameter of which reduces slightly from the head 27 to a lower zone 31 from which the tube 25 integrally leads to pass through the shell opening 24 in a substantially air tight manner simply by compression between the tube 25 and the margin of the opening 24. The length of the inflation 26 between the head 27 and the zone 31 has a rather thin wall and is made out of a suitable substance, preferably a pliable synthetic rubber which is practically immune to deterioration from greases, and has long life under repeated flexing, bending, and change of shape. The tube 25 as above indicated is more rigid although bendable, and leads to a connection (not shown) with the claw or pail unit receiving the milk, and to which unit there are normally attached four of the teat cup assemblies.

Figure 7:
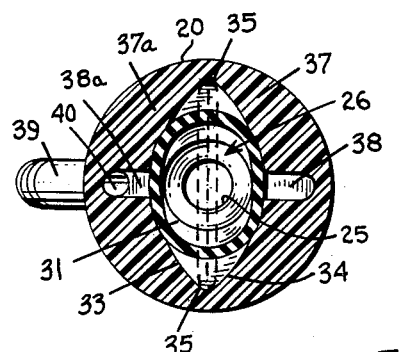
FIG. 7 is a view in transverse section on the line 7—7 in FIG. 4.

The inside of the shell 20 starts tapering inwardly from the full diameter end 22 from opposite sides to set up an elliptical contour of gradually flattening opposing sides down to a zone 32 at which the section 7—7 is taken. The progression of this narrowing elliptical shaping is indicated throughout the sections 5, 6, and 7. It is to be noted that the side walls 33 and 34 of the elliptical shape have junction one with the other not through the normal rounded elliptical ends, but through more or less sharpened ends 35, a slight radius being across this junction as best indicated in FIG. 7. While the walls 33 and 34 are approaching one another in this change in contour from the circular end 23 to the zone 32, it is to be noted that the ends 35 remain at a constant distance of spacing one from the other from the end 23 to the zone 32. In fact, these walls 33 and 34 by the time they reach the zone 32 are substantially, in the major lengths thereof, parallel one with the other, and this parallel relation continues downwardly from the zone 32 to the lower end 36 of the shell. Likewise the straight line relationship of the ends 35 continues to that end 36.

In this peculiar shaping of the inside of the shell 20, and in the maintaining of the cylindrical outer surface of the shell, there is a thickening of the wall from top to the zone 32. From the zone 32 to the lower end 36, this thickness remains constant. That is the thickness as indicated in FIG. 7 is that thickness between the zone 32 and the shell end 36.

The thickened portions 37 and 37a of the shell 20 are provided with vertically extending slots, one in each instance, indicated by the numerals 38 and 38a. These slots open through the walls 33 and 34, but are closed at their opposite ends. These slots 38 and 38a extend from the bottom 36 of the shell 20 upwardly to approximately the top, full circular end 22. The slots are diametrically opposed to be in the thickest portions of the wall parts 37 and 37a.

A nipple 39 is attached to the lower end of the shell 20 externally thereof, and has a passageway 40 leading therethrough to open into one of the slots, herein shown as the slot 38a.

When the inflation 26 is positioned within the shell 20 as indicated in FIG. 4, the lower end 31 of the inflation is well down within the constant width of the lips below the zone 32. Since this portion of the inflation is originally cylindrical, it is deformed, as is also the portion of the inflation thereabove which comes into contact with the inside wall of the shell 20 whereby the inflation itself begins to assume a shape slightly elliptical such as at the elevation on which the section 6—6 is taken, and this elliptical shape then begins to flatten out as indicated in FIG. 7 to remain somewhat constant downwardly through the remainder of the shell between the zone 32 and the bottom of the inflation at the zone 31 from which the tube 25 leads. The tube 25 being less flexible than is the inflation proper, will not assume the elliptical shape, but will preserve its cylindrical shape since that is the shape of the margin of the opening 24 through the shell.

Figure 5:
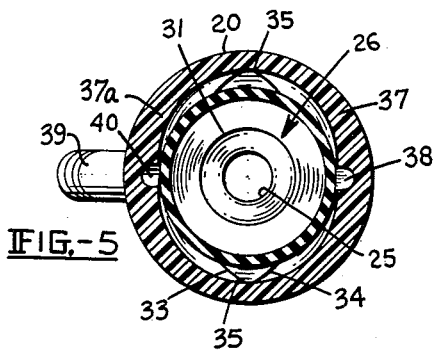
FIG. 5 is a transverse section on the line 5—5 in FIG. 4.

It is to be noted, that beginning at the elevation where the section 5—5 is taken, the outer side of the inflation is only slightly spaced on opposite sides only from contact with the inner wall of the shell 20, the sides of the inflation across the slots 38 and 38a, being in contact with the wall at each side thereof, FIG. 5. The degre of clearance between the outside of the inflation and the inside of the shell 20 at this zone will vary somewhat depending on the size of the inflation employed, but normally this clearance will be somewhat close to that indicated in FIG. 5.

Figure 6:
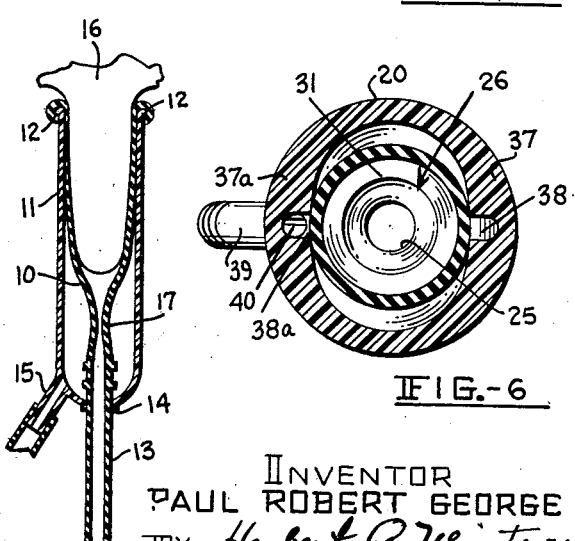
FIG. 6 is a view in transverse section on the line 6—6 in FIG. 4.

Now in operation, the cow's teats will reach down within the inflation 26 to a little above the level on which the section 6—6 is taken so that the teat is generally entirely within the circular part of the inflation, this circular portion not having been changed until the inflation passes down through the shell and through the zone at the section 6—6 line and therebelow. With the tube 25 connected to the milk receiving means and consequently the vacuum inducing line, when the vacuum is thus formed within the lower part of the inflation 26, milk will be induced to flow from the cow's teat down through the lower portion of the inflation and out through the tube 25, these parts having large passageways to accommodate the flow of milk without restriction. When the milk flow has continued as has been predetermined by the length or duration of the milking cycle, the vacuum induced through the nipple 39 outside of the inflation 26, the application of the vacuum being enhanced by the reason of the presence of the slots 38 and 38a to substantially the entire length of the inflation and around the outside of the cow's teat, this vacuum condition is destroyed in the pulsating action by the nipple 39 being opened up to entrance of air from the atmosphere so that the pressure is quickly increased within the shell 20 around the inflation, and this means that the inflation, being quite flexible will quickly increase the major longitudinal axis of its elliptical shape predetermined by the side walls 33 and 34, FIG. 7, to cause the inflation to flatten along that axis to the condition shown by the dash lines in FIG. 7, whereby the inflation then serves along this line as a shut off valve restricting any further application of vacuum from the tube 25 to the cow's teat. This flattening action of course is induced by the combination of the vacuum pressure within the lower end of the inflation and the atmospheric pressure externally thereof. This flattened condition of the lower end of the inflation will continue until the pulsator cuts off the entrance of atmospheric pressurized air through the nipple 40 and interconnects the nipple with the vacuum producing mechanism so that the inflation is quickly restored to its position as indicated in FIGS. 6 and 7 particularly. The cycle is thus continued, with the application of the vacuum a slightly major part of the period of the cycle and non-application during the lesser period as applied to the teat of the cow itself.

The shape of the lower end of the inflation is quickly changed as has been indicated, and this is accelerated by the presence of the vertical grooves 38 and 38a, and also further by the reason of circumferential ribs 41 around the tube 25 between the end 36 of the shell and the zone 31 at the interconnection with the inflation. This means that there is air passage circumferentially around the tube between the two vertical slots 38 and 38a. The external diameter of the tube 25 is such that it does not fill up the minor elliptical axis of the elliptical shape which would be the axis centrally of the two vertical slots 38 and 38a. Also it is to be noted that the upper end of the constant shaped elliptical form from the zone 32 downwardly there is a curve 42 on the one side and 43 on the other side outwardly therefrom and into the straight inclined lines 44 and 45 along the edges of the slots 38 and 38a. This peculiar formation gives a quickened gripping of the inflation at the zone 32 when it leaves the gradually sloping sides 33 and 34 and enters the constantly spaced apart sides traversing the shell 20 from that zone 32 to the end 36. It is at these curving portions 42 and 43 that the flattening of the inflation begins when the atmospheric air is applied externally thereof.

While I have herein shown and described my invention in the one particular form, it is obvious that structural variations may be employed in both the shell and the inflation without departing from the spirit of the invention, thus do not desire to be limited to that precise form beyond the limitations which may be imposed by the following claims.

I claim:

1. A milking machine teat cup comprising
   a rigid shell having an upper end opening substantially circular in contour, and an opposite lower end circular opening of lesser diameter than that of the upper end;
   an internal passageway having a wall merging from said circular opening into an elliptical contour decreasing by transverse, minor axis lengths to a shell zone spaced from said upper end, the ellipitical wall contour continuing with a fixed minor axis length from said zone to said opposite end;
   a slot laterally extending from said passageway wall centered approximately on said minor axis and extending approximately throughout the length of said passageway; and
   an air conducting member carried by the shell adjacent said opposite end and having a passageway therethrough opening into said slot; and
   an inflation having one end portion fitting snugly over said shell upper end;
   a major, circular tubular body length fixed to said portion and extending through said shell passageway to and through said passage zone for a distance within said fixed minor axis length; and
   a circular tube of diameter less than that of said body extending from the body and through said shell opposite end opening;
   said inflation body length being flexible and elastic and normally approximately cylindrical and being distorted from its cylindrical shape adjacent said shell upper end into elliptical shape of decreasing minor axis by contact with said passageway wall through said zone; and
   said tube having a wall less flexible than the wall of said body and remaining approximately of constant diameter.

2. The structure of claim 1, in which said elliptical passageway has a major axis of approximately constant length throughout the shell.

3. The structure of claim 2, in which said inflation elliptical shape predetermines an approach to a lower body portion flattened state to have opposite body sides below a cow's teat within the inflation come into milk flow shutoff contact on or immediately below the cow's teat along the major axis of the passageway contour under minus atmospheric pressure within said tube and atmospheric pressure in said slot; the said merging of the passageway wall reducing the air space within the shell externally of the inflation; and the length of said major axis being sufficient to receive fully and freely opposite folds of the flattened inflation portion.

4. The structure of claim 2, in which said major axis has a length approximately equal to the diameter of said upper end circular opening.

5. The structure of claim 1, in which there is a second slot diametrically opposite the first slot and extending throughout the length of said passageway.

6. The structure of claim 5, in which said inflation tube is of less diameter than the length of said passageway minor axis.

References Cited in the file of this patent

UNITED STATES PATENTS

| 1,945,386 | Stampen | Jan. 30, 1934 |
| 2,687,112 | Shurts | Aug. 24, 1954 |

FOREIGN PATENTS

| 676,157 | Great Britain | July 23, 1952 |